UNITED STATES PATENT OFFICE.

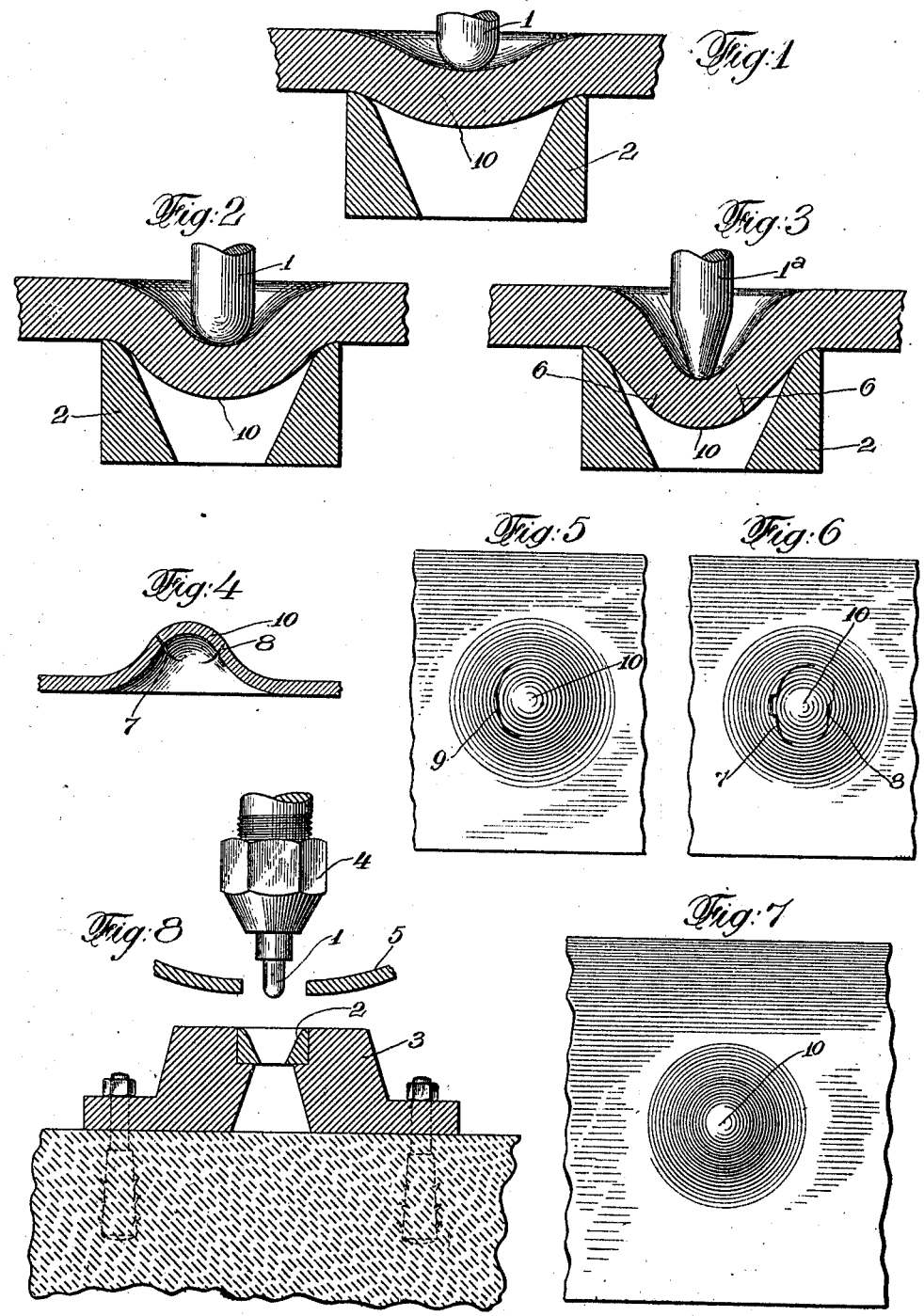

PERCY S. HILDRETH, OF NEW YORK, N. Y.

METHOD OF TESTING AND MARKING METAL STRUCTURAL WORK.

974,269.  Specification of Letters Patent.  Patented Nov. 1, 1910.

Application filed April 14, 1908. Serial No. 427,024.

*To all whom it may concern:*

Be it known that I, PERCY S. HILDRETH, a citizen of the United States, and a resident of the borough of Manhattan, city, county, and State of New York, have invented a certain new and useful Improved Method of Testing and Marking Metal Structural Work, of which the following is a specification.

My invention relates to processes for testing and marking metals and is especially adapted to the testing and marking of iron, steel and the like which is to be used for rails, structural and other work.

It has been common in former processes for testing to do the testing at the mill; a furnace charge or melt of from 10 to 50 tons is cast into ingots and rolled into rails, beams, angles, plates or similar pieces. From such pieces strips or testing pieces are cut and prepared and are submitted to the usual breaking test in a tension testing machine and tested for tensile strength, ductility, etc., and a similar strip or piece is bent to determine ductility, brittleness and workable qualities of the material. Such a test must suffice for all the structural material made up from that "melt"; hence if a fair sample of the melt is not taken the results obtained may be far from correct. Moreover it is often the case that the material made up from a single melt is not all sent to the same customer, but different parts thereof may be sent to different customers and to widely different localities. This necessitates that each customer send an inspector to the mill to make certain that his material will be up to the required standard. It will thus be seen that such a method of testing is open to many criticisms in that the test may not correctly show the true character of the whole "melt" and that the inspection of the "melt" by several inspectors makes the cost thereof, excessive.

It is the object of my invention to provide a process which will practically eliminate these difficulties, which will enable the testing to be done either at the mill or at the place where the material is to be used, or wherever material may be and which will materially decrease the expense thereof. By my invention one is enabled not only to quickly and thoroughly test and mark each single piece of material but to leave the indicia and mark of the test upon the material so that it may be inspected at any time or in any place. This is important, in that, since the indicia or mark is left on each piece the qualities of any piece may be ascertained without going in to the records of the whole "melt." And furthermore the indicia and marks are of such a character that they do not materially affect the strength of the materials or impair their qualities in any way. Therefore the very pieces which are to be used in actual structural work may themselves be tested, and in such a way that the pieces are marked with indicia of the qualities or characteristics thereof and so that these qualities and characteristics may be ascertained at any time even after the piece is in its place in structural work. To attain these objects and various other advantages, as will more fully appear hereinafter, I subject the plate or piece of metal to be tested, to certain stresses and strains and produce therein a permanent deformation. If the plate or piece of metal does not rupture or show signs of rupture it may be said to withstand the test and be up to a certain standard as to tensile strength and ductility.

In order that my invention may be clearly understood reference is made to the accompanying drawing in which—

Figure 1 is a section of a plate being mildly tested. Fig. 2 is a similar view in which the material is being subjected to a more severe test. Fig. 3 is a similar view in which the material is being subjected to a still more severe test and under which the material has failed. Fig. 4 is a section of relatively thin plate after being subjected to a test. Figs. 5 and 6 are plan views of plates after they have been subjected to tests. Fig. 7 is a similar plan view of a plate which withstood the test. Fig. 8 is a vertical view partly in section of dies used to perform the tests.

Referring to Fig. 8, 1 and 2 represent a pair of dies suitable for carrying out a test. The lower die 2 is provided with a suitable framework 3 and the upper die 1 is provided with suitable securing means 4. 5 represents a stripping plate which operates in a well known manner. The lower die 2 is made somewhat larger than the upper die 1, and of such a shape that the punching or shearing action of the dies will be greatly reduced and more drawing and bending action will be produced. This is important since thereby the material is subjected to at least three different actions and its various qualities dependent upon the result of these actions are thereby efficiently tested.

In carrying out the marking and testing the dies 1 and 2 are brought together by means of any suitable power to produce a permanent cup-shaped deformation in a relatively thin portion of the material. That is, the die 1 preferably moves in a plane parallel with the thinnest cross-section of the material. The severity of the test may be adjusted by predetermining and regulating the length of the stroke of the die 1, and by changing the size of both or either of the dies. In Fig. 1 the material is shown as subjected to a very light test and has withstood the test. In Fig. 2 the material has been subjected to a more severe test and has also withstood the test. In Fig. 3 the material is shown as subjected to a still more severe test and has failed under the test. The failure is indicated by the ruptures in the material at 6. In this figure a differently shaped upper die is shown. This die 1ª is more pointed and produces more of the bending and drawing actions in the material. Figs. 4, 5 and 6 show various views of a thinner plate which has failed under the tests. The ruptures have a tendency to form in a more or less circular path around the deformation as shown at 7, 8 and 9. Whether or not these ruptures follow such a circular path or follow the grain of the material is also another indication of certain qualities of the material. By taking into consideration the size of the ruptures, whether or not they pass entirely through the material, the relative and actual size of the dies, the length of stroke of the upper die or the depth of the deformation one may readily ascertain the various qualities of the material as to tensile strength, ductility, etc., by simply comparing his observations with the results of previous tests in which the various qualities of the material were known beforehand. Besides being simple, effective, and accurate, these tests are such that the depression 10, with or without its ruptures, may be left at all times upon the material. Thus the marks of the indicia of the qualities of the material, or marks showing the results of the test, are always at hand and cannot be lost; and anyone wishing to learn of the qualities of the material at any time, only has to inspect the permanent deformation 10, and by referring to data of previous tests the desired information is readily acquired.

Fig. 7 shows a plan view of a piece of material which has been subjected to but did not fail under the test.

By examination of the ruptures in the permanent deformation the various qualities of the material as to tensile strength, ductility, brittleness, etc., and workable qualities of the material, may be readily and reliably ascertained, and this whether the material is in actual use as structural work in a building or other structure, or as railroad rails or whether the material is not in actual use.

Having thus fully described my improved method of testing iron and steel plates and the like, what I claim as new and desire to secure by Letters Patent, is:

The method of testing and certifying the workable qualities of a metallic structure part as distinguished from a test piece which consists in stamping or punching upon a thin portion of said part a cup-shaped depression of definite and predetermined depth, substantially as described, whereby the condition of the surfaces of the depression is at once a test and a certificate of the workable qualities and strength of that particular part.

In testimony whereof, I have signed my name to this specification, in the presence of two subscribing witnesses.

PERCY S. HILDRETH.

Witnesses:
 GORHAM CROSBY,
 EDWIN SEGER.